United States Patent [19]

Sleeter

[11] Patent Number: 5,719,301
[45] Date of Patent: Feb. 17, 1998

[54] METHOD OF CONJUGATING DOUBLE BONDS IN DRYING OILS

[75] Inventor: Ronald T. Sleeter, Decatur, Ill.

[73] Assignee: Archer Daniels Midland Company, Decatur, Ill.

[21] Appl. No.: 472,919

[22] Filed: Jun. 7, 1995

Related U.S. Application Data

[63] Continuation-in-part of Ser. No. 402,109, Mar. 10, 1995, abandoned.

[51] Int. Cl.$^6$ .................................................. C09F 7/00
[52] U.S. Cl. ............................. 554/24; 554/31; 554/126
[58] Field of Search ............................ 554/126, 24, 31

[56] References Cited

PUBLICATIONS

Chemical Abstracts, vol. 96; Ucciani et al, 1981, 70499.
Chemical Abstracts, vol. 77, Sengir et al, 1972, 100826.

*Primary Examiner*—Gary Geist
*Assistant Examiner*—Deborah D. Carr
*Attorney, Agent, or Firm*—Laff, Whitesel, Conte & Saret, Ltd.

[57] ABSTRACT

The invention provides a method of conjugating double bonded drying oil so that a relatively low cost linseed oil, for example, can replace the more expensive, naturally conjugated tung oil which has been used heretofore. The conjugation is brought about by the use of ruthenium as a catalyst, with formic or a similar acid providing a synergistic augmentation of the reaction. The conjugated oil may have many uses, but a major object is to provide a way to enhance a phenolic resin adhesive used on wood and wood products.

32 Claims, No Drawings

METHOD OF CONJUGATING DOUBLE BONDS IN DRYING OILS

This is a continuation-in-part of Ser. No. 08/402,109, filed Mar. 10, 1995, now abandoned.

This invention relates to new and improved drying oils and more particularly to such oils having better drying qualities and still more particularly to such oils which have such superior drying qualities as to enable them to be capable of being used as part of an improved bonding system for various wood and fiber products.

"Drying oils" are triglycerides which have the ability to dry or polymeriza. Some examples of drying oils are: linseed, fish, soybean, tall, tung, castor and oiticica. Drying oils are composed of fatty acids which have a preponderance of two or three double bonds. The drying ability of these oils is related to their Iodine Value ("IV"), which is a quantitative measure of the number of double bonds that they contain. Oils in the range of 195–170 IV are relatively fast-drying. Oils in the range of 140–120 IV are semi-drying, and oils with IV's under 120 are non-drying.

"Drying oils" include conjugated oils. The term "conjugation" is used herein to describe triglycerides which have double bonds on adjacent carbon atoms.

For natural oils containing more than one carbon to carbon double bond, the double bonds are generally separated by a methylene group, commonly referred to as being "methylene interrupted" These fats and oils have nutritional benefits; however, the methylene interruption limits their use in industrial polymerization applications, where they could find use as coatings, adhesives and the like. For these fats and oils to be so used industrially, they need to polymerize rapidly. For this to occur, it is advantageous to have the double bonds adjacent to one another or "conjugated" (i.e., the methylene interrupt is shifted or relocated).

In reference to a "modified methylene interrupted" common vegetable oil, the term modified relates to common modifications to which common vegetable oils may be subjected, such as interesterification, fractionation, winterization and the like. These are processes which modify the fatty acid distribution of the original oil. For example, palm oil may be subjected to fractionation in order to form a palm olein fraction. This fraction might then have enough unsaturation to qualify for this process whereas it otherwise would not qualify.

A simple explanation of this methylene interrupt shift is illustrated by the following example showing only carbon atoms:

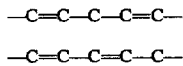

The carbon chain on the left is methylene interrupted between the two carbon atoms having double bonds. The carbon chain on the right is conjugated by shifting the methylene group to the end of the chain of carbon atoms.

For these vegetable oils to be useful industrially, they need to be made to polymerize rapidly. This can be accomplished by conjugating the double bonds to produce rapidly polymerizing oils. Over the years, many methods have been developed to produce conjugated oils by shifting the methylene interruption between the double bonds. Unfortunately, only limited commercial amounts of such modified vegetable oils have been produced using these methods due to their expense and other limitations.

Additionally, insofar as is known, drying oils generally have not played an important role as part of bonding systems. However, the present invention converts vegetable oils into a form with a host of formerly unknown and unanticipated uses including use in bonding systems, especially—but not exclusively—for bonding various wood, wood chip, fiber and composite materials. More particularly, these modified vegetable oils have been found to be useful in making new and improved oriented strand board ("OSB"), particle board, plywood and the like.

While wood is one of the world's most significant renewable resources, the supply of large diameter trees is decreasing. As a result, the production of OSB and other wood composites is becoming extremely important both for cost and for environmental reasons. By way of comparison, plywood manufacture utilizes only about 60–70% of the tree stem, whereas OSB can utilize up to 90% of the tree stem.

Wood composite products require adhesives as bonding systems. Regardless of the composite, the wood fibers, chips and fillers are usually bonded with phenolic resins, polymeric methylene diphenyl diisocyanates, protein glues, etc. More particularly, when OSB or particle board is made, the wood and an adhesive are placed in a press which applies heat and pressure, the temperature, time and pressure each being a function of the composite being produced.

This invention produces conjugated drying oils which are synergistic coadhesives when used as a portion of a bonding system with the phenolic resins, diisocyanates, etc. They impart substantial benefit by producing boards having nearly double the strength of boards prepared without them. Hence, a rapid and economical process for the conjugation of oils is desirable in order to impart better drying characteristics to common vegetable oils and to produce conjugated oils capable of improving the bonding of resins for wood products and the like a common vegetable oil is a commercially available vegetable oil having at least a 30% content of linoleic acid plus/or limolenic acid content.

Tung oil is a naturally conjugated oil and is used as a premium oil for fine wood finishes. However, it is expensive, it is imported, and it has had an unreliable supply from year to year. It would be most advantageous to modify commercially and readily available vegetable oils by converting them into conjugated oils.

Several candidates could be considered to replace tung oil. Linseed oil is the first choice due to its high levels of unsaturation (IV=155–205), especially of linolenic acid which generally exceeds 55% by weight. Linseed has well-known agronomic properties and has been grown in the past in large quantities. Soybean oil and safflower oil are two other candidates. However, they are generally considered less desirable because they have less total unsaturation with most of the unsaturated fatty acids being linoleic (IV= 120–141 and 145 respectively).

Prior methods for the conjugation of double bonds yield low conversions requiring long reaction times at high temperatures. This low yield favors subsequent polymerization of the conjugated products being formed thereby additionally lowering the yield. The conjugation of the oil proceeds through an optimum yield of conversion at which point polymerization outpaces conjugation and the amount of conjugated oil actually decreases as the reaction proceeds. This ultimately produces an oil of such high viscosity as to render it useless for many applications. Some of these procedures producing low levels of conjugation are represented in the following list:

| Catalyst | General Yield | Reference |
| --- | --- | --- |
| Nickel/Carbon | 34% | Ind. and Eng. Chem. 997–1002 (1946), S. B. Radlove, H. M. Teeter, W. H. Bonds, J. C. Cowan and J. P. Kass |
| Primary Alcohols | 19% | U.S. Pat. No. 2,242,230 (May 20, 1941), George Burr |
| Aliphatic Organic Iodides | 30% | U.S. Pat. No. 2,422,112 (November 12, 1946), Anderson Ralston and Otto Turinsky |
| Inorganic Iodides | 24% | U.S. Pat. No. 2,411,113 (November 12, 1946), Anderson Ralston and Otto Turinsky |
| $SO_2$ | 11% | U.S. Pat. No. 3,278,567 (October 11, 1966), Walter E. Ratjen, Lowell O. Cummings and John A. Kneeland |
| Sulfur organics (Aryl Thiols) | 18% | U.S. Pat. No. 3,784,537 (January 8, 1974); U.S. Pat. No. 3,925,342 (December 9, 1975) Roland Peirre Franz Scharrer |
| Amine Hydroiodides | 37% | U.S. Pat. No. 2,411,111 (November 12, 1946), Anderson W. Ralston and Otto Turinsky |
| $SOCl_2$ (of esters) | Small | Yukagaku 1970, 153–7 Hisako Shiina and Tetsutaro Hashimoto |
| Anthraquinone | 19% | JAOCS 237–243 (1948), L. B. Falkenburg, Wm. DeJong, D. P. Handke and S. B. Radlove |
| Alkali (of esters) | 50% Range | G. S. R. Sastry, B. G. K. Murthy, J. S. Aggarwal, Paint Manufacturing 32–4 (1970) |
| Alkali (Potassium T-Butoxide) | 38% | B. S. Sreenivasan and J. B. Brown, JAOCS 35 89–92 (1958) |
| Iodine | 40% | Yukagaku 28 600–604 (1979), Yasuhiko Kubota and Tetsutaro Hashimoto |
| Hydrosilicones with metal catalyst | 60% | U.S. Pat. No. 3,449,384, Hans Ender |
| Dehydration of Caster Oil | 50% + | Ind. Eng. Chem., Prod. Res. Dev., 16 107–111 (1977) |

There are several methods which have produced high levels of conjugation without concomitant polymerization. These reactions are fairly efficient and produce highly conjugated products with significantly less polymerization. Thus, these oils are quite fluid. Some of these methods are described in the following documents:

| Catalyst | General Yield | Reference |
| --- | --- | --- |
| Chromium Carbonyls | 45–65% | JAOCS 47, 33–36 (1969), E. N. Frankel |
| Iron Pentacarbonyl | 95% | JAOCS 44,37–9 (1967), U.S. Patent 3,373,175, U.S. Pat. No. 3,392,177, E. N. Frankel |
| Rhodium/Iridium organometallic complexes | 50% + | European Patent EP 0 160 544 A. Basu, Sumit Bhaduri and T. K. G. Kasar |
| Ruthenium on Carbon | 80% + | European Patent EP 0 040 577, Georges Cecchi and Eugene Ucciani |
| Rhodium/Ruthenium organochlorin complexes | 80% + | German Patent 2 049 937 Helmut Singer, Werner Stein and Herbert Lepper |

Most of the prior methods described in the foregoing documents have significant drawbacks. The carbonyls are highly toxic and very difficult to work with. Iron pentacarbonyl is flammable at room temperature. The reaction requires a high pressure vessel capable of withstanding 1500 PSI and 200° C. Recovery of the iron pentacarbonyl is very slow and a significant loss of unrecovered catalyst into the oil makes it an uneconomical process. Organo-rhodium and organo-iridium catalysts are very expensive beginning with the purchase price of the metal prior to the added expense of synthesis of the organocomplex. These reactions require 12 hour reaction times and substantial amounts of catalyst. Although the catalyst has been reported to be recovered in good yield by using a non-polar solvent, this comes at an additional processing cost, along with the danger of the use of flammable solvents. Furthermore, the amount of residual catalyst remaining in the oil following the recovery step has not been determined, but it is thought to be too high to make the process economical.

It has been found that the ruthenium on carbon, as practiced by Cecchi and Ucciani in the European Patent Application No. 0 040 577, was not capable of reuse as claimed. It is critical for a process of this nature to be capable of numerous reuses due to the expense of the catalyst. Catalyst activity for used catalyst of this patent is reduced by a factor of one-half for every reuse, when used for conjugation of linseed oil. Typical conversions start at 85% conjugation for the first reaction, about 40% conjugation for the second reaction with the catalyst used once, and about 20% conjugation for the third reaction with the catalyst used twice. Therefore, for practical commercial products, the Cecchi-Ucciani procedure leads to a prohibitively high cost to make conjugated oil, primarily due to the loss of catalyst activity. Thus, the use of ruthenium on carbon alone is not a viable process.

Use of rhodium and ruthenium organochlorines as catalysts (German Patent 2 049 937) converts linseed oil to high levels of conjugation (>60%). However, nearly 0.3% ruthenium is used as a 22% component in an organochlorine complex. The reaction temperature is governed by the decomposition temperature of the complex. One example is useful to illustrate catalyst reuse. In this case, the product, soybean oil fatty acids, was distilled from the catalyst. This would not be possible with triglycerides. Thus, for practical commercial products, the process would be prohibitively expensive with this large amount of ruthenium, if the catalyst cannot be recovered.

One other study, by A. Basu, S. Bhaduri and K. R. Sharma, "Metal clusters in Homogeneous Catalysis: isomerization of Methyl Linoleate", Adv. Catal. (Proc. Natl. Symp. Catal.) 7th, 1985, describes the reaction of tetracarbonyl triruthenium and other compounds from a reaction standpoint. The catalysts are added at a nearly equivalent basis. Using the teachings of this work in a practical commercial process to manufacture conjugated oils would result in a level of consumption of ruthenium which would be intolerably high and prohibitively expensive.

It has been discovered that most organo-ruthenium complexes, ruthenium salts and, to a limited degree, ruthenium covalent compounds and ruthenium salts in which ruthenium is in any of its several valence or oxidation states, catalyze the conjugation of methylene interrupted double bonds in common vegetable oils. Most compounds of ruthenium which can be solubilized into the substrate (oils with high Iodine Values composed of methylene interrupted double bonds) are or form active homogeneous catalysts to conjugate double bonds. Indeed, organic compounds in general which have methylene interrupted double bonds can be conjugated with the process of this invention.

It has been found that the successful use of these forms of ruthenium depends upon the presence of an acid during the reaction. The preferred acid is formic acid. Some other acids such as organic acids (e.g., acetic, benzoic, oxalic) or HCl (in gaseous form) and also some low molecular weight alcohols (e.g., methanol, ethanol and isopropyl alcohol) work with ruthenium, but to a much lesser degree.

Also, combinations of these acids, such as formic acid and HCl (gaseous), may be used. In addition, surprisingly low levels of ruthenium of the order of 10–20 ppm can achieve in excess of 80% conversion to conjugation. These catalysts can be used at any level, although the conversion of methylene interrupted double bonds to conjugated double bonds decreases in efficiency as lower and lower levels of catalyst are used based on ruthenium content. Thus, the level of ruthenium as metal should be at least about 5 ppm and not more than about 200 ppm, based on the weight of the oil being treated.

A level of about 10–50 ppm ruthenium is preferred and a level of about 10–20 ppm is most preferred. On the other hand, the level of acid should be not more than about 4 percent by weight, based on the weight of the oil being treated, with the lower end being determined on a case-by-case basis. The preferred level of acid will be about 0.8 to 2.4 percent by weight.

Finally, the reaction should be carried out in the absence of any significant amounts of oxygen. Thus, common vegetable oils such as linseed oil may, in accordance with my invention, be conjugated efficiently and economically to produce modified oils having unique drying properties.

For an analysis of the extent of reaction, the disappearance of linolenic and linoleic acids is monitored by gas liquid chromatography ("GLC"). For convenience, the conjugation yield is then calculated as a percentage loss of linolenic acid. For example, typically pure unreacted linseed oil is analyzed at 58.4% linolenic acid by GLC. A reaction which resulted in a 20.0% linolenic acid is referred to as having a 65.8% conjugation.

$$(1-20.0/58.4 \times 100) = 65.8$$

This calculation is an oversimplification because not all of the generated compounds are conjugated. Furthermore, polymerization can occur and these compounds are "counted" as being conjugated oil under this simplified analysis regime. Nevertheless, this analysis is extremely useful when following the reactions and rating their relative effectiveness.

A second analytical method has been developed for analyzing the extent of reaction. This method employs a use of the Fourier Transform infrared Spectrophotometry ("FTIR"). The peak monitored is in the 945–990 cm-1 wavelength band which is specific for trans and conjugated isomers. It has been that found this data to closely correlate with the above described GLC data.

Stated another way, a way was discovered to use ruthenium in micro amounts of many forms and states in order to catalyze this reaction in the presence of acid. Ruthenium is a unique metal capable of forming many diverse compounds and complexes. A 1373 page treatise, *The Chemistry of Ruthenium*, by Seddon and Seddon, Elsevier Science Publishers, New York, 1984, attests to this fact. Since so many compounds of ruthenium exhibit catalytic activity with the present invention, it is impossible to test or list all of these compounds. Therefore, set out below are examples of classes of ruthenium compounds which may be used in order to illustrate the broad range of possibilities. Hence, the examples which are presented below should not be construed to limit this invention.

Examples of useful ruthenium complexes are dodecacarbonyl triruthenium, dichlorotris(triphenylphosphene) ruthenium (II) and ruthenium (III) 2,4-pentanedionate. An example of a useful ruthenium salt is ruthenium (III) chloride hydrate which is particularly preferred in the practice of this invention. An example of a covalent compound is ruthenium dioxide.

Optimally, it has been found for dodecacarbonyl triruthenium, a 50 ppm ruthenium basis amount of catalyst converted linseed oil to 75% conjugated linolenic acid and 26% conjugated linoleic acid product with a reaction temperature of 180° and a reaction time of 1 hour. With the triphenylphosphene, reaction of the methylene interrupted double bonds had somewhat increased selectivity forming a greater proportion of trans isomers prior to proceeding to conjugation. It was intensely active, producing 85.3% conjugation of linolenic acid in three hours with 10 ppm ruthenium basis and 180°. The pentanedionate gave a conjugation of 50.7% at 20 ppm and 180° C.

It has been found in nearly all cases that when most forms of ruthenium are allowed to come into contact with the substrate under the reaction conditions, they will solubilize into the substrate as homogeneous catalysts or be converted into homogeneous catalysts. Solubilization and activation of the ruthenium is achieved optimally with the use of formic acid. The greatest success is achieved by the presentation of ruthenium to the substrate (linseed oil or organic compound) in a monomolecular form. Most organo-ruthenium complexes are soluble in the substrate allowing the dispersal of ruthenium in molecular form. The ruthenium, so dissolved, can then be further reacted and activated into highly active catalysts by formic acid and other acids and alcohols, as discussed above. The action of the formic acid is not fully understood at this time. It may act to reduce the ruthenium complex into dispersed metallic molecular ruthenium.

The only potential catalyst found not to work was ruthenocene, bis(cyclopentadienyl)ruthenium, which is a sandwich compound consisting of ruthenium between two cyclopentadiene rings. This compound had no catalytic activity. The ruthenium in this compound is fully enclosed between the cyclopentadiene rings. Thus, it is not accessible to promote catalysis. Furthermore, ruthenocene was found to be too stable to react with formic acid in order to form an active catalyst under the conditions of reaction. Thus, it would seem that perhaps other stable ruthenium compounds in which the ruthenium is not accessible might also be excluded from the practice of my invention.

It is preferred in the practice of my invention to use ruthenium (III) chloride hydrate. This compound is preferred not only because of cost and availability, but also because no costly conversion to an organo-ruthenium complex is required. As an example, $RuCl_3$-hydrate may be solubilized into linseed oil by prior solubilization into alcohols or organic acids such as methanol, ethanol or formic acid. The resulting $RuCl_3$ solution can then be dispersed and eventually completely dissolved into solution. For example, only 20 ppm of ruthenium as $RuCl_3$-hydrate was found to be needed to produce a conjugation of 85% of linseed oil. At this rate of usage, a commercially viable process is achievable because the cost of the loss of ruthenium is not prohibitive even if it is not recovered.

Another advantage gained with the present invention is the production of a product which does not need filtration or any other treatment prior to shipment for use. The color of the oil produced is very light.

In some cases antioxidants act to prolong catalyst life and synergistically help promote faster conjugation thereby enabling the efficient use of lower amounts of catalyst to achieve higher levels of conjugation which would not otherwise be achievable. A conventional antioxidant, such as tocopherol, may be used to enhance the reaction and reduce free radical catalyzed polymerization. This polymerization can occur during the high temperature conjugation reaction. The use of specific antioxidants would be based on price and benefit.

The following working examples are given to illustrate the wide range of successful ruthenium compounds which may be used. All of the following reactions were run under argon.

EXAMPLE ONE

Dodecacarbonyl triruthenium was added to refined and bleached linseed oil (in most examples the linseed oil was refined bleached or refined bleached and dewaxed) on a 50 ppm ruthenium basis [Ru=47.4% of $Ru_3(CO)_{12}$].0.026 grams of $Ru_3(CO)_{12}$ was added to 250 grams of linseed oil at room temperature. The reaction mixture was heated to 180° C. for a period of one hour. 2.2 grams of formic acid was added slowly throughout the reaction period in order to help catalyze the double bond migration. The product, analyzed by GLC, yielded a conjugated product with 75% C18-3 and 29% C18-2 conjugated. The reaction was allowed to continue to determine the full extent of conjugation that is achievable within a reasonable time. The conjugated C18-3 was 90% in three hours total reaction time. An additional 4.4 grams of formic acid was added by the end of the reaction.

EXAMPLE TWO

A reaction similar to the one above was run with 0.010 grams of $Ru_3(CO)_{12}$ (20 ppm Ru). The conversion for conjugated C18-3 was 55% in one hour, 66% in two hours and 73% in 3 hours. The conjugated C18-2 was 16.9% in one hour, 22.5% in two hours and 26.9% in three hours.

EXAMPLE THREE

A third reaction was run as above, but with 15 ppm Ru. The conjugation conversion was 47.6% conjugated C18-3 and 10.8 conjugated C18-2 during a three hour reaction.

EXAMPLE FOUR

A 5% ruthenium on carbon catalyst was used to produce a 75% conjugated linseed oil. The primary mode of the catalysis used is ruthenium in a monomolecular form, which is then solubilized into the oil to form a homogeneous catalyst. This was shown by taking the final product of this reaction containing 83.1 ppm (solubilized) Ru. This reaction mixture was diluted about one-to-one with fresh unconjugated linseed oil. The resultant mixture contained 29.5% conjugated C18-3 and 5.4% conjugated C18-2. This mixture was heated to 180° C. for one hour with the addition of 2.2 grams of formic acid over the reaction period. The final product was analyzed by GLC and found to have 48.3% conjugated C18-3 and 15.5% conjugated C18-2. This proved that the active form of the catalyst is soluble ruthenium metal acting as a homogeneous catalyst. Thus, it appears that almost any method of solubilizing ruthenium metal into a monomolecular form in the oil should work as a catalyst system.

EXAMPLE FIVE

Two reactions were run for three hours each with Dodecacarbonyl triruthenium (20 ppm ruthenium) at 180° C. One reaction had Tenox 20 added in the amount of 0.5%. Samples were taken at hourly intervals. At each step, the reaction with the antioxidant out-performed the reaction without.

| Reaction | Percent C18-3 | Percent C18-2 |
| --- | --- | --- |
| 1 hr w/o antioxidant | 34.6 | 8.1 |
| 1 hr w antioxidant | 58.6 | 10.8 |
| 2 hr w/o antioxidant | 54.8 | 22.6 |
| 2 hr w antioxidant | 68.5 | 23.0 |

EXAMPLE SIX 250 grams of linseed oil were allowed to react with 20 ppm ruthenium as ruthenium dichlorotris (triphenylphosphene) with formic acid addition. Conversion of the linolenic acid was 82% in one hour and 97% in three hours. Linoleic acid conversion was 55% in one hour and 90% in three hours.

EXAMPLE SEVEN

A reaction similar to Example Six, using the triphenylphosphene, was run with 20 ppm of ruthenium with ruthenium 2,4-pentanedionate. Conjugation was not as high with 51% C18-3 in four hours.

EXAMPLE EIGHT

A reaction was run with 20 ppm of ruthenium as ruthenium (III) chloride hydrate (assay of 41.0% Ru). The reaction temperature was 180° C. Formic acid was added a drop at a time to 250 grams of bleached linseed oil. Conversion to conjugated oil as measured by the disappearance of linolenic and linoleic acids was 61% C18-3 and 27% C18-2 in one half hour. Conjugation went to 88% for C18-3 and 51% for C18-2 in three hours.

EXAMPLE NINE

Another reaction with ruthenium (III) chloride similar to the preceding reaction was run with 10 ppm Ru. Conversion was 49% C18-3 and 14% C18-2 in four hours.

EXAMPLE TEN

A reaction was run during which formic acid was added to the reaction mixture at the beginning of the reaction and, additionally, HCl gas was bubbled in, initially and at hourly intervals. The ruthenium catalyst was solubilized from a carbon support. The HCl synergistically augmented the reaction so that it was 95% conjugated within a half hour and it started to polymerize after an hour reaction time.

Other organic acids work, but not as well as formic acid. Benzoic acid was substituted in a reaction with 20 ppm of Ru as $RuC_3$-hydrate and conjugation was only up to 35% C18-3 in four hours.

Alcohols work to some degree to catalyze the reaction, but with less efficiency than formic acid. Ethanol added a drop at a time over the reaction period, in a manner similar to the formic acid addition, produced a conjugation of 21% C18-3 in four hours using 20 ppm Ru as $RuCl_3$-hydrate.

EXAMPLE ELEVEN

As a control reaction, 250 grams of linseed oil, prebleached with bleaching earth, was allowed to react with 20 ppm ruthenium as $Ru_3(CO)_{12}$ at 180° C. for several hours under an argon atmosphere.

Experimental reactions were run by adding 0.1% by weight of conventional antioxidants. Generally improvement in activity was observed during the first hour of reaction after which the conjugation equalized.

| | Percent Conversion to Conjugation | | |
| --- | --- | --- | --- |
| Reaction Time | Control | BHA | BHT |
| 1 Hour | 44.0 | 51.5 | 49.3 |
| 2 Hours | 58.6 | 57.9 | 53.4 |

A number of other ruthenium compounds were also studied for the catalyst activity that they could produce in conjugating double bonds in drying oils, primarily linseed oil. Primarily, the study was conducted on conjugation in linseed oil. These compounds were selected due to their commercial availability and because they represented a cross section of classes of such compounds. Tests were run on these compounds to show the wide diversity of molecular forms of ruthenium compounds which yield some catalytic activity following a loss of non-conjugated oil. For example, ruthenium triacetate represents the class of fatty acid or organic acid ruthenium salts. Ruthenium bromide is another compound which is representative of the halogen salts. The ammonium complexes of ruthenium are representative of nitrogen containing compounds. Other and more exotic and non-commercial compounds may be studied but their expense would limit their practical use.

EXAMPLE TWELVE

All of the reactions in this example were run in the same manner in order to provide a comparison. Two hundred and fifty grams of bleached linseed oil were treated with each of the following catalysts on a 10 ppm ruthenium basis. The reaction was run at 180° C. for three hours under nitrogen in order to substantially eliminate or greatly reduce oxygen. One ml of formic acid was added at once as soon as the linseed oil reached 150° C. After the initial 1 ml portion was added, an additional 7 ml of formic acid was added a drop at a time during a remainder of the reaction time. During this working example, other ruthenium compounds that were tested for catalyst activity are:

(a) chloro pentaamine ruthenium (III) chloride, [(NH$_3$)$_5$5RuCl]Cl$_2$, produced 13% conjugation in three hours on a 10 ppm Ru basis;

(b) ruthenium triacetate, Ru(OAc)$_3$, caused 71% conjugation in three hours on an approximate 50 ppm basis;

(c) ammonium hexachlororuthenium (IV), (NH$_4$)$_2$RuCl$_6$ resulted in 31.3% conjugation in three hours on a 10 ppm basis;

(d) potassium Ru-oxoopentachloro ruthenium (IV), K$_4$(RuCl$_5$)$_2$O caused 18.7% conjugation in three hours on a 10 ppm basis;

(e) cis-dichloro-bis (2, 2'-bipyridine) ruthenium (II), RuCl$_2$(ClOH$_8$N$_2$)XH$_2$O, produced 33% conjugation in three hours on a 10% ppm basis;

(f) ruthenium bromide hydrate caused 15.6% conjugation in three hours on a 10 ppm basis;

(g) ruthenium dioxide hydrate, RuO$_2$.H$_2$O, 11.1% conjugation in three hours on a 10 ppm basis;

(h) ruthenium nitrosyl nitrate, Ru(NO)(NO$_3$)$_3$, 55.1% conjugation on a 10 ppm basis;

(i) In addition, some other acids were studied for their effectiveness. Benzoic acid was used in place of formic acid, resulting in a 25% conjugation. Glacial acetic acid was tried and found to produce 23% conjugation. Oxalic acid produced 29% conjugation. All of these reactions with different acids were run on a 20 ppm basis of Ru; and (j) for comparison, 10 ppm of ruthenium as ruthenium (III) chloride hydrate (6.0 mg RuCl$_3$.2H$_2$O) dissolved in 3 ml of anhydrous ethanol was added to 250 g. of bleached linseed oil after heating to 240° C. The addition of 7 ml of formic acid a drop at a time during the reaction period of 3 hours at 180° C. produced a conjugation of 86.7%.

EXAMPLE THIRTEEN

Another example of a successful method of running a reaction as described in example twelve with ruthenium (III) chloride hydrate at 180° C. is as follows:

Mix ruthenium (III) chloride hydrate and water to make a 13% aqueous solution. This was used directly as catalyst for the reaction. The solution was added to 250 g of bleached linseed oil at room temperature using about 2 ml of ethanol to help rinse the last traces of solution into the oil. One ml of formic acid was added at 150° C. followed by an addition of 6 ml a drop at a time over the reaction period of 3 hours. The conjugation achieved was 77.1%.

The methods of examples twelve J and 13 were judged to be the easiest methods to best disperse and solubilize the ruthenium (III) chloride hydrate in the linseed oil.

EXAMPLE FOURTEEN

This example was run substantially as described in examples twelve to thirteen. Other dispersants of solubilizers were tried, such as glycerine and triglycerol mono oleate. These dispersants did work with conjugations of 36% and 14%, respectively, using 10 ppm RuCl$_3$ hydrate. But the end results were not as favorable as the end result of example fourteen, which used ethanol.

EXAMPLE FIFTEEN

As an example of other oils which may be conjugated using the process of example twelve, the most important from the standpoint of economics, availability, and favorable unsaturation is soybean oil. This oil was shown to conjugate to 82% by using 20 ppm ruthenium as a trichloride hydrate at 180° C. with 7 ml of formic acid and 250 grams of refined and bleached soybean oil.

EXAMPLE SIXTEEN

Another example of other oils was also tried. A determination of enhanced drying was made when tung oil, a naturally occurring conjugated oil, was subjected to the same reaction conditions. The tung oil that was used had an alpha-eleostearic acid content of 73.8% prior to reaction. After a three hour reaction time using ruthenium (III) chloride hydrate on a 10 ppm ruthenium basis, similar to the reaction conditions mentioned above, 58.3% alpha-eleostearic acid remained unchanged. The other 21.0% was apparently rearranged to trans isomers. Later eluting peaks in the GLC analysis increased.

Those who are skilled in the art will readily perceive how to modify the invention. Therefore, the appended claims are to be construed to cover all equivalent structures which fall within the true scope and spirit of the invention.

What is claimed is:

1. A one phase method of conjugating methylene interrupted organic compounds comprising:

solubilizing ruthenium in a methylene interrupted organic compound to a level which provides a homogenous catalysis;

reacting methylene interrupted organic compounds, in the absence of oxygen and in the presence of an acid, with said solubilized ruthenium compound homogenous catalyst selected from the group consisting of organoruthenium complexes, soluble ruthenium metal, ruthenium salts, and ruthenium covalent compounds, said ruthenium being a metal which is about 5 ppm and not more than about 200 ppm, based upon the weight of the methylene interrupted organic compound.

2. The method of claim 1 in which the ruthenium compound is an organic-ruthenium complex.

3. The method of claim 1 in which the ruthenium compound is a ruthenium salt.

4. The method of claim 1 in which the ruthenium salt is ruthenium (III) chloride hydrate.

5. The method of claim 1 in which the ruthenium compound is a ruthenium covalent compound.

6. The method of claim 5 in which the ruthenium covalent compound is ruthenium dioxide.

7. The method of claim 1 wherein the ruthenium compound is ruthenium triacetate.

8. The method of either claim 1 or claim 3 wherein the ruthenium compound is ruthenium bromide hydrate.

9. The method of claim 1 wherein the ruthenium compound is chloro pentaamine ruthenium (III) chloride.

10. The method of claim 1 in which the level of ruthenium as metal is about 10–50 ppm based on the weight of the organic compound.

11. The method of claim 1 in which the acid is chosen from the group consisting of organic acids and gaseous HCl.

12. The method of claim 11 in which the acid is formic acid.

13. The method of claim 1 in which a combination of formic acid and gaseous HCl is used as the acid.

14. The method of claim 1 in which the acid is benzoic acid.

15. The method of claim 1 in which the acid is glacial acetic acid.

16. The method of claim 1 in which the acid is oxalic acid.

17. The method of claim 1 wherein the acid is an organic acid.

18. The method of claim 1 in which a low molecular weight alcohol is used in lieu of the acid.

19. The method of claim 1 in which the level of acid is not more than about 4% by weight, based on the weight of the organic compound.

20. The method of claim 1 in which the level of the acid is about 0.8–2.4% by weight, based on the weight of the organic compound.

21. The method of claim 1 in which the organic compound is a common vegetable oil having an iodine value of at least 120.

22. The method of claim 21 in which the common vegetable oil is linseed oil.

23. The method of claim 15 in which the common vegetable oil is soybean oil.

24. A method of conjugating methylene interrupted organic compounds comprising:

solubilizing ruthenium in methylene interrupted organic compound to a level which provides a homogenous catalysis;

reacting methylene interrupted organic compounds, in the absence of oxygen and in the presence of an acid, and with said solubilized organo-ruthenium complexes, the ruthenium complex being selected from the group consisting of: dodecacarbonyl triruthenium, dichlorotris (triphenylphosphene) ruthenium (II) and ruthenium (III) 2,4-pentanedionate.

25. The method of claim 24 in which the ruthenium complex is dodecacarbonyl triruthenium.

26. A method of conjugating methylene interrupted organic/compounds comprising:

solubilizing ruthenium in a methylene interrupted organic compound to a level which provides homogenous catalysis;

reacting methylene interrupted organic compounds, in the absence of oxygen and in the presence of an acid, with said solubilized a ruthenium compound selected from the group consisting of organoruthenium complexes, soluble ruthenium metal, ruthenium salts, and ruthenium covalent compounds; and a conventional antioxidant.

27. A method of conjugating methylene interrupted vegetable oils comprising:

solubilizing ruthenium in a methylene interrupted organic compound to a level which provides homogenous catalysis;

reacting methylene interrupted vegetable oils, in the absence of oxygen and in the presence of formic acid, with a ruthenium compound chosen from the group consisting of organoruthenium complexes, soluble ruthenium metal, ruthenium salts, and ruthenium covalent compounds.

28. A modified methylene interrupted common vegetable oil having an iodine value of at least 120, said oil being prepared by first solubilizing ruthenium in a methylene interrupted organic compound to a level which provides homogenous catalysis and then reacting the common vegetable oil in the absence of oxygen and in the presence of an acid, with a solubilized ruthenium compound chosen from the group consisting of organo-ruthenium complexes, soluble ruthenium metal, ruthenium salts, and ruthenium covalent compounds.

29. A method of conjugating methylene interrupted vegetable oils comprising the steps of:

(a) selecting at least one methylene interrupted fatty acid oil from a group consisting of linseed, fish, soybean, tall, tung, corn, sunflower, safflower, castor, and oiticica;

(b) reacting the oil selected in step (a) a ruthenium catalyst taken from a group consisting of organo-ruthenium complexes, soluble ruthenium metal, ruthenium salts, and ruthenium covalent compounds to form a homogeneous catalyst;

(c) conducting the reaction of step (b) in an absence of oxygen; adding a methylene interrupted vegetable oil selected from the group consisting of linseed, soybean, corn, sunflower, safflower, castor, and oiticica; and (d) adding a synergistic reaction augmentation material taken from a group consisting of formic acid, gaseous hydrogen chlorine, benzoic acid, glacial acetic acid, oxalic acid, ethanol, glycerine, and triglycerol mono oleates.

30. The method of claim 29 wherein step (b) includes bringing the materials of steps (a) and (b) to a predetermined temperature, adding a portion of the material of step (d) when the predetermined temperature is reached, and then adding the remainder of said material of step (d) incrementally throughout substantially the remainder of step (b).

31. The method of claim 30 wherein said predetermined temperature is within a range of approximately 150° C.–200° C.

32. The method of claim 31 wherein the time required for the reaction of step (b) is in the range of approximately 1–4 hours.

* * * * *